United States Patent
Dupont et al.

(10) Patent No.: US 8,720,982 B2
(45) Date of Patent: May 13, 2014

(54) ARRANGEMENT FOR A FRONT PORTION OF A MOTOR VEHICLE

(75) Inventors: Christophe Dupont, Vimy (FR); Alain Hourdel, Forges les Bains (FR); Yannick Le Roch, Saint Leger en Yvelines (FR); Sylvie Pichaud, Gif sur Yvette (FR); Nicolas Vasseur, Farbus (FR)

(73) Assignee: Renault S.A.S., Guyancourt (FR)

( * ) Notice: Subject to any disclaimer, the term of this patent is extended or adjusted under 35 U.S.C. 154(b) by 0 days.

(21) Appl. No.: 13/260,072

(22) PCT Filed: Mar. 17, 2010

(86) PCT No.: PCT/FR2010/050479
§ 371 (c)(1),
(2), (4) Date: Dec. 21, 2011

(87) PCT Pub. No.: WO2010/109114
PCT Pub. Date: Sep. 30, 2010

(65) Prior Publication Data
US 2012/0091760 A1    Apr. 19, 2012

(30) Foreign Application Priority Data
Mar. 25, 2009   (FR) ...................................... 09 51912

(51) Int. Cl.
*B62D 25/08* (2006.01)
(52) U.S. Cl.
USPC ....................................... 296/193.09; 296/29
(58) Field of Classification Search
USPC ......... 296/193.1, 193.11, 187.09, 29, 193.01, 296/193.09; 293/115, 120, 121, 102
See application file for complete search history.

(56) References Cited

U.S. PATENT DOCUMENTS

| 7,644,966 B2 * | 1/2010 | Huber et al. ................... 293/155 |
| 2002/0117875 A1 * | 8/2002 | Hoffner et al. ................. 296/194 |

FOREIGN PATENT DOCUMENTS

| DE | 10 2006 059028 | 6/2008 |
| EP | 1 623 879 | 2/2006 |
| EP | 1 977 957 | 10/2008 |
| JP | 2001 018837 | 1/2001 |
| WO | 2009 013416 | 1/2009 |

OTHER PUBLICATIONS

International Search Report issued Jul. 1, 2010 in PCT/FR10/050479 filed Mar. 17, 2010.
French Search Report issued Oct. 16, 2009 in French Patent Application No. 09 51912 filed Mar. 25, 2009.

* cited by examiner

*Primary Examiner* — Glenn Dayoan
*Assistant Examiner* — Melissa A Black
(74) *Attorney, Agent, or Firm* — Oblon, Spivak, McClelland, Maier & Neustadt, L.L.P.

(57) ABSTRACT

An arrangement for a front portion of a motor vehicle, including at least one structural box element including two substantially longitudinal intermediate beams and two upper substantially longitudinal elements at an end of which is attached a transverse technical element and supporting parts of the vehicle, the front portion supporting at least two headlights of the vehicle, a bumper, and two abutments for closing an associated hood. The transverse element includes at least two opposing upper transverse arms extending from a central portion and an end of each of which is attached to the upper longitudinal elements and includes a mechanism attaching at least one attachment tab of an associated headlight, at least one attachment point of the bumper, and the hood-closing abutment.

12 Claims, 3 Drawing Sheets

ARRANGEMENT FOR A FRONT PORTION OF A MOTOR VEHICLE

BACKGROUND

The invention relates to an arrangement for a front portion of a motor vehicle.

The invention relates more particularly to an arrangement for a front portion of a motor vehicle comprising at least one structural box element comprising two substantially longitudinal intermediate beams at the end of which is attached a transverse element called "technical front face" supporting members of the vehicle, the front portion supporting at least two headlights of the vehicle, one bumper cowling and two stops for the closure of an associated hood.

Many examples of arrangements of this type are known.

Document FR 2.874.585 describes an arrangement of this type in which the technical front face supports two stops for closing the associated hood.

BRIEF SUMMARY

The invention is based on the understanding that the technical front face could be used to support a higher number of elements in order to reduce the time taken to assemble the associated vehicle.

This is made possible notably by the recent changes in the safety standards with respect for example to the attachment of the bumper cowlings or the raising of the position of the headlights of vehicles in order to protect against an impact with the head of a child.

Moreover, in the context of a vehicle of the multipurpose type, the headlights are arranged in an elevated position relative to the structural box element. It is therefore necessary to provide a technical front face extending high enough relative to the structural box element to allow said headlights to be attached.

For this purpose, the invention proposes an arrangement of the type described above comprising a high technical front face supporting many elements.

For this purpose, the invention proposes an arrangement of the type described above, characterized in that the transverse element comprises at least two opposite transverse upper arms extending from a central portion, the end of each of which is attached to two upper longitudinal elements supported by substantially vertical legs extending from the substantially longitudinal intermediate beams, and in that each upper arm comprises means for attaching at least one lug for attaching an associated headlight, at least one attachment point for the bumper cowling and one stop for closing the hood.

According to other features of the invention:

- each vertical leg is connected by means of a substantially transversal tie-rod to at least one adjacent lateral element of the structural box element of the vehicle in order to prevent said leg from deforming,
- the tie-rod is arranged vertically beneath a lower level of a headlight of the vehicle,
- the end of each arm comprises an attachment portion called "structural" comprising first means for attaching the arm to the end of the associated upper longitudinal element and second means for attaching the lug for attaching the headlight to the arm,
- the first means for attaching the arm to the end of the associated upper longitudinal element comprise a substantially vertical hole passing through the end of each structural attachment portion, which is designed to receive a vertical screw for attaching said structural attachment portion to an upper face of the end of the associated upper longitudinal element,
- the second means for attaching the lug for attaching the headlight to the arm comprise a substantially vertical tapping formed in each structural attachment portion, which is designed to receive a vertical attachment screw passing through the horizontal lug for attaching the headlight,
- the arrangement comprises a means for aligning the attachment portion and the lug of the headlight which consists of a post protruding from an upper face of the end of the associated upper longitudinal element, which passes through a recess of each structural attachment portion and is received at least in abutment against a vertical face of said recess and of which the end is received in a matching oblong hole formed in the horizontal lug for attaching the headlight,
- the recess of each structural attachment portion extends from a vertical edge of each structural portion and has the general shape of a "V" of which the vertical edges join together along a vertical bearing surface in order to form a housing of curvature corresponding substantially to the diameter of the post, the vertical bearing surface forming the vertical abutment face of said recess,
- the structural attachment portion comprises means for attaching an upper casing comprising a third means for attaching the point for attaching the bumper cowling and a fourth means for attaching a stop for closing the hood,
- each structural attachment portion comprises at least one recess in the form of a frame receiving in the central portion a barrel in which the hole is made that is designed to receive the screw for attaching the structural portion to the upper longitudinal element and which is linked by stiffeners to the walls of the frame,
- the upper casing comprises at least one vertical wall corresponding with an edge of the frame of each structural attachment portion opposite to the tapping and the means for attaching the upper casing to the structural attachment portion comprise:
  - at least two lower elastic vertical lugs extending in line with the vertical wall, of which end spigots are designed to be received in matching apertures formed in the associated vertical edge of the frame in order to allow the upper casing to be attached by fitting together,
  - at least one horizontal lug of which a hole coincides with the tapping and is designed for the screw for attaching the headlight to pass through,
  - at least one vertical positioning lug, which extends vertically under the casing and which is designed to pass through the oblong hole of the lug for attaching the headlight in order to rest tangentially on the post.
- the third means for attaching the attachment point of the bumper cowling comprises a first bearing surface consisting of a boss which extends from an upper face of the casing and which comprises a tapping designed to receive a screw passing through a hole formed in a wall of the bumper cowling,
- the fourth means for attaching the stop for closing the hood comprises a second bearing surface which extends along the upper face of the casing, in which two upper notches are designed to receive by fitting together two spigots formed at the end of the elastic arms of a clip having substantially the shape of an inverted "U" which is designed to pass through a matching window made in the wall of the bumper cowling and in which the opposite end for joining the arms supports the stop for closing the hood.

BRIEF DESCRIPTION OF THE DRAWINGS

Other features and advantages of the invention will appear on reading the following detailed description, for the understanding of which reference will be made to the appended drawings in which.

DETAILED DESCRIPTION

In the following description, identical reference numbers indicate parts that are identical or have similar functions.

Figure 1:
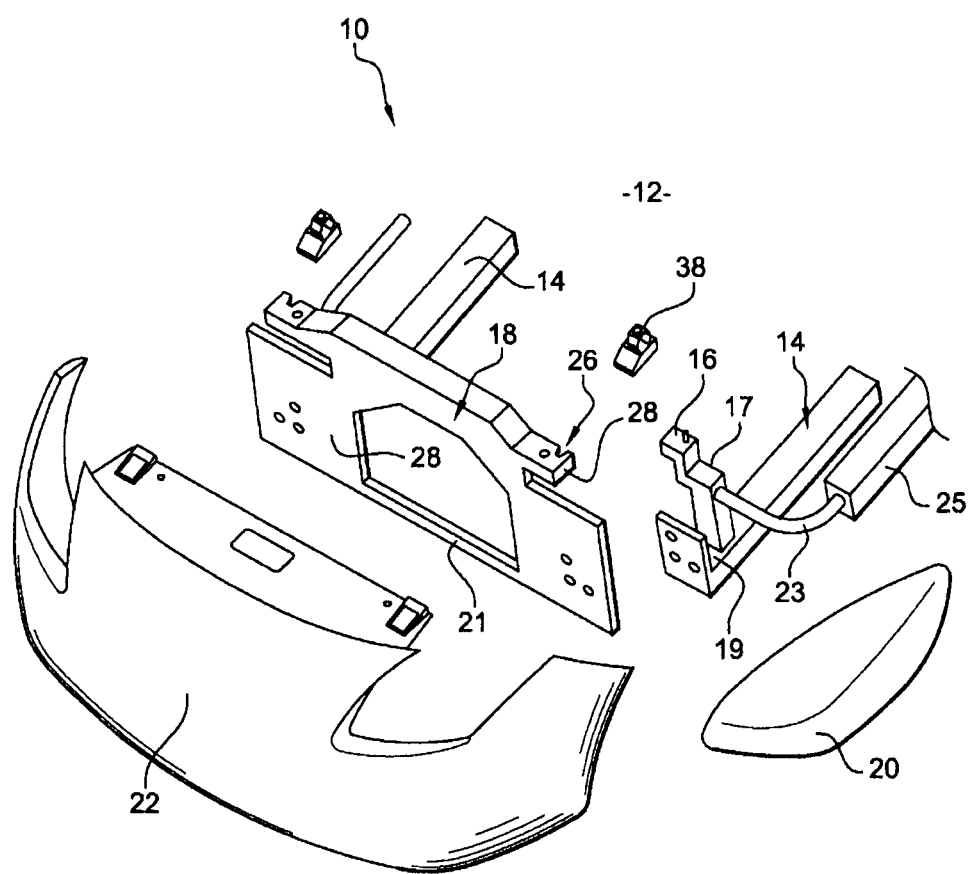
FIG. 1 is an overview of an arrangement according to the invention.

FIG. 1 shows an arrangement 10 for a front portion 12 of a motor vehicle comprising at least one structural box element comprising two substantially longitudinal intermediate beams 14 at the end of which is attached a transverse element 18 called the "technical front face" supporting members of the vehicle, the front portion supporting at least two headlights 20 of the vehicle, one bumper cowling 22 and two stops 38 for the closure of an associated hood (not shown).

Figure 2:
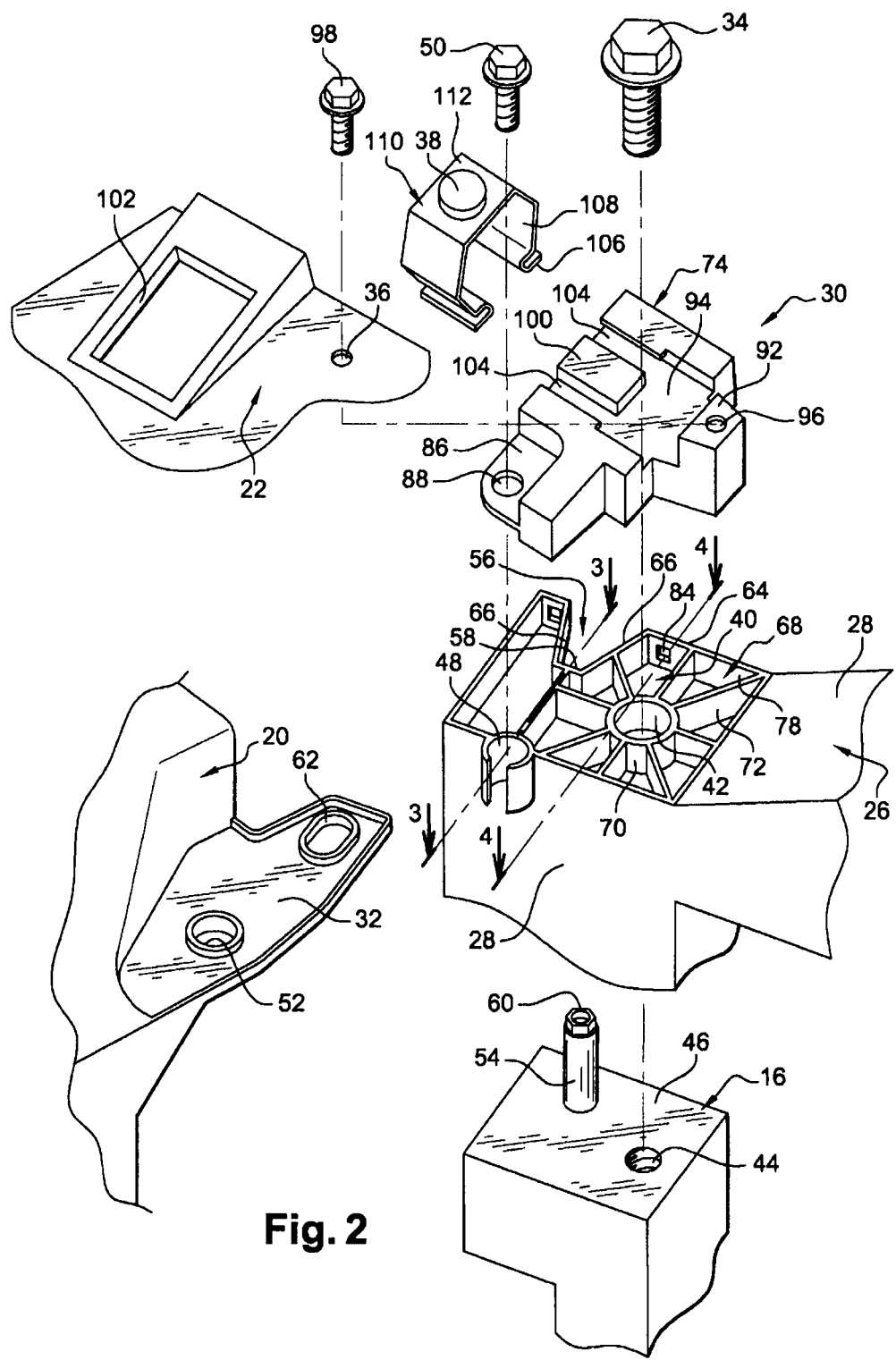
FIG. 2 is an exploded view in detail of the means for attaching a lug for attaching an associated headlight, a point for attaching the bumper cowling and a stop for closing the hood on the transverse element called the "technical front face" of the arrangement of FIG. 1.
Figure 3:
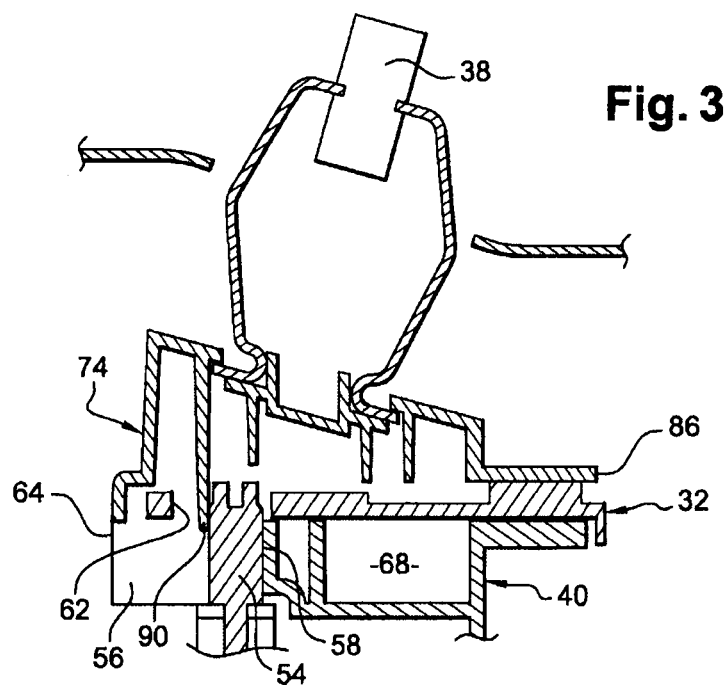
FIG. 3 is an assembled view in section of the attachment means through the plane 3-3 of FIG. 2.

According to the invention, as partially illustrated in FIG. 1 and more precisely in FIG. 2, the transverse element 18 comprises at least two opposite transverse upper arms 26 extending from a central portion 21, the end 28 of each of which is attached to two upper longitudinal elements 16 supported by substantially vertical legs 17 extending from the substantially longitudinal intermediate beams 14.

Moreover, the end 28 of each upper arm 26 comprises means 30 for attaching at least one lug 32 for attaching an associated headlight 20, at least one point 36 for attaching the bumper cowling 22, and one stop 38 for closing the hood.

Each leg 17 is made by stamping and by welding an is welded to the end 19 of each beam 14.

Preferably, each vertical leg 17 is connected by means of a substantially transversal tie-rod 23 to at least one adjacent lateral element 25 of the structural box element of the vehicle in order to prevent the leg 17 from deforming.

Preferably, the tie-rod 23 is arranged vertically under a lower level (not shown) of a headlight of the vehicle, which corresponds substantially to half-way up the leg 17.

More particularly, as illustrated in FIG. 2, the end 28 of each arm 26 comprises an attachment portion 40 called "structural" comprising first means for attaching the arm 26 to the end of the associated upper longitudinal element 16 and second means for attaching the lug 32 for attaching the headlight 20 to the arm 26.

Several production methods may be suitable for producing the first attachment means. However, in the preferred embodiment of the invention, the first means for attaching the arm 26 to the end of the associated upper longitudinal element 16 comprise a substantially vertical hole 42 passing through the end of each structural attachment portion 40, which is designed to receive a vertical screw 34 for attaching said structural attachment portion which is received in an open-ended hole 44 in an upper face 46 of the end of the associated upper longitudinal element 16.

Moreover, the second means for attaching the lug 32 for attaching the headlight 20 to the arm 26 comprise a substantially vertical tapping 48 formed in each structural attachment portion 40 which is designed to receive a vertical attachment screw 50 passing through a hole 52 formed in the horizontal lug 32 for attaching the headlight 20.

Preferably, the arrangement comprises a means for aligning the attachment portion 40 and the lug 32 of the headlight in order to ensure a correct positioning of the hole 52 with respect to the tapping 48.

This alignment means consists of a post 54 protruding from the upper face 46 of the end of the associated upper longitudinal element 16, which passes through a recess 56 of each structural attachment portion 40 and is received at least in abutment against a vertical face 58 of said recess 56, and of which the end 60 is received in a matching oblong hole 62 formed in the horizontal lug 52 for attaching the headlight 20.

In the preferred embodiment of the invention, the recess 56 of each structural attachment portion 40 extends from a vertical edge 64 of each structural portion and has the general shape of a "V" of which the vertical edges 66 join together along a vertical bearing surface 58 in order to form a housing of curvature corresponding substantially to the diameter of the post 54, the vertical bearing surface 58 forming the vertical abutment face of said recess 56.

Preferably, each structural attachment portion 40 is made in one piece with the transverse element 18 by a molding process. This makes it possible to produce the recess 56 easily when molding each structural attachment portion.

As illustrated in FIG. 2, each structural attachment portion 40 comprises at least one recess 68 in the form of a frame receiving in the central portion a barrel 70 in which is made the hole 42 designed to receive the screw 34 for attaching the structural portion 40 to the upper longitudinal element 16 and which is linked by stiffeners 72 to the walls of the frame 68. The recess in the form of a frame, the barrel 70 and the stiffeners 72 also therefore originate from the molding of the element 18.

Advantageously, the structural attachment portion 40 comprises means for attaching an upper casing 74 comprising a third means for attaching the point 36 for attaching the bumper cowling 22, and a fourth means for attaching a stop 38 for closing the hood.

Figure 4:
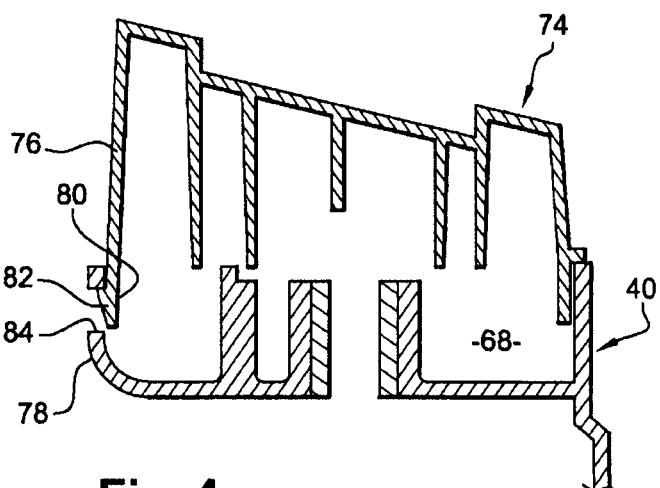
FIG. 4 is an assembled view in section of the attachment means through the plane 4-4 of FIG. 2.

As illustrated in FIG. 4, the upper casing 74 comprises at least one vertical wall 76 corresponding with an edge 78 of the frame 68 of each structural attachment portion opposite to the tapping 48 and the means for attaching the upper casing 74 to the structural attachment portion 40 comprising:

at least two lower elastic vertical lugs 80 extending in line with the vertical wall 76, of which end spigots 82 are designed to be received in matching apertures 84 formed in the associated vertical edge 78 of the frame 68 in order to allow the upper casing 74 to be attached by fitting together, at least one horizontal lug 86 of which a hole 88 coincides with the tapping 48 and is designed for the screw 50 for attaching the headlight 20 to pass through, at least one vertical positioning lug 90, which extends vertically under the casing 74 and which is designed to pass through the oblong hole 62 of the lug for attaching the headlight 20 in order to rest tangentially on the post 54.

This configuration advantageously makes it possible to satisfactorily immobilize the casing 74 on the structural attachment portion 40.

In this configuration, the third means for attaching the attachment point 36 of the bumper cowling 22 comprises a first bearing surface consisting of a boss 92 which extends from an upper face 94 of the casing and which comprises a tapping 96 designed to receive a screw 98 passing through a hole 36 formed in a wall of the bumper cowling 22.

Moreover, the fourth means for attaching the stop for closing the hood comprises a second bearing surface 100 which extends along the upper face 94 of the casing 74, in which two upper notches 104 are designed to receive by fitting together two spigots 106 formed at the end of the elastic arms 108 of a clip 110 having substantially the shape of an inverted "U" which is designed to pass through a matching window 102 made in the wall of the bumper cowling 22 and in which the opposite end 112 for joining the arms supports the stop 38 for closing the hood.

Thus, the clip 110 passes through the bumper wall 22 and is used to support the stop 38 at a sufficient distance from the bumper 22 to provide the stop for the hood. It will be noted that the clip 110 may advantageously be made of a steel of the spring steel type allowing its arms 108 to flex which makes it possible to achieve in a very simple manner a damping of the hood when it meets the stop 38.

The invention therefore makes it possible to propose grouped means for attaching at least one lug 32 for attaching a headlight 20, at least one point 36 for attaching a bumper cowling 22 and a stop 38 for closing a hood.

The invention claimed is:

1. An arrangement for a front portion of a motor vehicle comprising:
    at least one structural box element comprising two substantially longitudinal intermediate beams at an end of which is attached a transverse element supporting members of the vehicle, the front portion supporting at least two headlights of the vehicle, one bumper cowling, and two stops for closure of an associated hood,
    wherein the transverse element comprises at least two opposite transverse upper arms extending from a top of a central portion of the box element, an end of each upper arm is attached to one of two upper longitudinal elements supported by substantially vertical legs extending from the substantially longitudinal intermediate beams, and
    wherein said end of each upper arm comprises a structural attachment portion comprising:
        first means for attaching the arm to an end of the associated upper longitudinal element, the first means including a hole passing through the structural attachment portion,
        second means for attaching a lug for attaching the associated headlight to the arm,
        means for attaching an upper casing comprising third means for attaching a point for attaching the bumper cowling, and
        fourth means for attaching the associated stop for closing the hood,
    wherein each structural attachment portion comprises a frame including a barrel within walls of the frame, the barrel surrounding the hole of the first means, the hole being configured to receive a screw for attaching the structural portion to the upper longitudinal element, and the barrel being linked by stiffeners to the walls of the frame such that openings are formed between the barrel and the walls of the frame.

2. The arrangement as claimed in claim 1, wherein each vertical leg is connected by a substantially transversal tie-rod to at least one adjacent lateral element of the structural box element of the vehicle to prevent the leg from deforming.

3. The arrangement as claimed in claim 2, wherein the tie-rod is arranged vertically beneath a lower level of the associated headlight of the vehicle.

4. The arrangement as claimed in claim 1, wherein the structural attachment portion is attached, via the screw, to an upper face of the end of the associated upper longitudinal element.

5. The arrangement as claimed in claim 1, wherein the second means for attaching the lug for attaching the headlight to the arm comprises a substantially vertical tapping formed in each structural attachment portion, which is configured to receive a vertical attachment screw passing through the horizontal lug for attaching the headlight.

6. The arrangement as claimed in claim 1, further comprising means for aligning the structural attachment portion and the lug of the headlight which includes a post protruding from an upper face of the end of the associated upper longitudinal element, which passes through a recess of each structural attachment portion and is received at least in abutment against a vertical face of the recess and of which the end is received in a matching oblong hole formed in the horizontal lug for attaching the headlight.

7. The arrangement as claimed in claim 6, wherein the recess of each structural attachment portion extends from a vertical edge of each structural portion and has a general shape of a "V" of which vertical edges join together along a vertical bearing surface to form a housing of curvature corresponding substantially to the diameter of the post, the vertical bearing surface forming the vertical abutment face of the recess.

8. The arrangement as claimed in claim 1, wherein the upper casing comprises at least one vertical wall corresponding with an edge of the frame of each structural attachment portion opposite to the tapping, and wherein the means for attaching the upper casing to the structural attachment portion comprises:
    at least two lower elastic vertical lugs extending in line with the vertical wall, of which end spigots are configured to be received in matching apertures formed in the associated vertical edge of the frame to allow the upper casing to be attached by fitting together,
    at least one horizontal lug of which a hole coincides with the tapping and is configured for a screw for attaching the headlight to pass through,
    at least one vertical positioning lug, which extends vertically under the casing and which is configured to pass through the oblong hole of the lug for attaching the headlight to rest tangentially on a post protruding from an upper face of the end of the associated upper longitudinal element.

9. The arrangement as claimed in claim 1, wherein the third means for attaching the attachment point of the bumper cowling comprises a first bearing surface including a boss which extends from an upper face of the casing and which comprises a tapping configured to receive a screw passing through a hole formed in a wall of the bumper cowling.

10. The arrangement as claimed in claim 9, wherein the fourth means for attaching the stop for closing the hood comprises a second bearing surface which extends along the upper face of the casing, in which two upper notches are configured to receive by fitting together two spigots formed at the end of the elastic arms of a clip having substantially a shape of an inverted "U" which is configured to pass through a matching window made in the wall of the bumper cowling and in which the opposite end for joining the arms supports the stop for closing the hood.

11. The arrangement as claimed in claim 5, wherein the vertical tapping of the second means for attaching is formed in each structural attachment portion on an opposite side of the walls of the frame from the barrel.

12. An arrangement for a front portion of a motor vehicle comprising:
  at least one structural box element comprising two substantially longitudinal intermediate beams at an end of which is attached a transverse element supporting members of the vehicle, the front portion supporting at least two headlights of the vehicle, one bumper cowling, and two stops for closure of an associated hood,
  wherein the transverse element comprises at least two opposite transverse upper arms extending from a top of a central portion of the box element, an end of each upper arm is attached to one of two upper longitudinal elements supported by substantially vertical legs extending from the substantially longitudinal intermediate beams,
  wherein said end of each upper arm comprises a structural attachment portion comprising:
    first means for attaching the arm to an end of the associated upper longitudinal element,
    second means for attaching a lug for attaching the associated headlight to the arm,
    means for attaching an upper casing comprising third means for attaching a point for attaching the bumper cowling, and
    fourth means for attaching the associated stop for closing the hood,
  wherein the third means for attaching the attachment point of the bumper cowling comprises a first bearing surface including a boss which extends from an upper face of the casing and which comprises a tapping configured to receive a screw passing through a hole formed in a wall of the bumper cowling, and
  wherein the fourth means for attaching the stop for closing the hood comprises a second bearing surface which extends along the upper face of the casing, in which two upper notches are configured to receive by fitting together two spigots formed at the end of the elastic arms of a clip having substantially a shape of an inverted "U" which is configured to pass through a matching window made in the wall of the bumper cowling and in which the opposite end for joining the arms supports the stop for closing the hood.

* * * * *